(12) United States Patent
Frekers et al.

(10) Patent No.: US 7,986,456 B2
(45) Date of Patent: Jul. 26, 2011

(54) SCANNER ARRANGEMENT AND METHOD FOR OPTICALLY SCANNING AN OBJECT

(75) Inventors: Dieter Frekers, Altenberge (DE); Christian Wachsmann, Münster (DE); Ishak Aksit, Münster (DE)

(73) Assignee: Westfälische Wilhelms-Universität Münster, Münster (DE)

( * ) Notice: Subject to any disclaimer, the term of this patent is extended or adjusted under 35 U.S.C. 154(b) by 1021 days.

(21) Appl. No.: 11/574,563

(22) PCT Filed: Aug. 30, 2005

(86) PCT No.: PCT/DE2005/001516
§ 371 (c)(1), (2), (4) Date: Aug. 6, 2007

(87) PCT Pub. No.: WO2006/024279
PCT Pub. Date: Mar. 9, 2006

(65) Prior Publication Data
US 2008/0259423 A1 Oct. 23, 2008

(30) Foreign Application Priority Data
Sep. 2, 2004 (DE) .......................... 10 2004 042 913

(51) Int. Cl.
*G02B 21/00* (2006.01)
(52) U.S. Cl. ..................................... 359/368; 359/210.1
(58) Field of Classification Search ........................ None
See application file for complete search history.

(56) References Cited

U.S. PATENT DOCUMENTS

| 4,998,802 | A | 3/1991 | Kasuga et al. |
| 5,870,222 | A | 2/1999 | Yamamoto et al. |
| 5,912,699 | A | 6/1999 | Hayenga et al. |
| 6,711,283 | B1 * | 3/2004 | Soenksen ...................... 382/133 |
| 2002/0057492 | A1 | 5/2002 | Watanabe |

(Continued)

FOREIGN PATENT DOCUMENTS
DE 3917724 A1 12/1989
(Continued)

OTHER PUBLICATIONS
Esp@cenet database, English abstract of JP63146011.
(Continued)

*Primary Examiner* — Stephone B Allen
*Assistant Examiner* — Derek S Chapel
(74) *Attorney, Agent, or Firm* — Cahn & Samuels, LLP

(57) ABSTRACT

A scanner arrangement (50), in particular a scanning microscope, for optically scanning an object (101) in a sequence of scanning steps, has: a drivable moving object stage (40) and an objective assembly (4, 7-10), which has a front objective lens (9, 103) on an objective lens carriage (8) which can be moved parallel to the object stage (40) by a carriage drive (5, 6, 10, 11), wherein the object stage (40) can be driven during the sequence of scanning steps in order to achieve a continuous movement and the objective lens carriage (8) with the front objective lens (9, 103) can be driven in each of the scanning steps for a forward movement step, in which the front objective lens (9, 103) is moved synchronously with the object stage (40) out of an initial position, and in each case between successive scanning steps for a backward movement into the initial position, with the object (101) being able to be optically scanned during the continuous movement of the object stage (40).

20 Claims, 5 Drawing Sheets

U.S. PATENT DOCUMENTS

| | | |
|---|---|---|
| 2002/0089740 A1 | 7/2002 | Wetzel et al. |
| 2002/0154396 A1 | 10/2002 | Overbeck |
| 2003/0063379 A1 | 4/2003 | Fukuyama et al. |

FOREIGN PATENT DOCUMENTS

| | | |
|---|---|---|
| DE | 19626298 A1 | 1/1998 |
| DE | 19752888 A1 | 6/1999 |
| EP | 0178077 A1 | 4/1986 |
| EP | 0557558 A | 9/1993 |
| EP | 1073926 B1 | 5/2003 |
| JP | 63146011 | 6/1988 |
| WO | 0184209 A2 | 11/2001 |

OTHER PUBLICATIONS

Esp@cenet database, English abstract of DE19752888.
IEEE, English abstract of DE19626298.
The International Bureau of WIPO, Notification of Transmittal of Translation of the International Preliminary Report on Patentability (Chapter I or Chapter II of the Patent Cooperation Treaty) for PCT/DE2005/001516, with English translation of Written Opinion, Mar. 15, 2007.

* cited by examiner

SCANNER ARRANGEMENT AND METHOD FOR OPTICALLY SCANNING AN OBJECT

This application is the National Stage of International Application No. PCT/DE2005/001516, filed on Aug. 30, 2005, which claimed the benefit of Application No. 10 2004 042 913.8 filed in Germany on Sep. 2, 2004.

I. FIELD OF INVENTION

The invention relates to a scanner arrangement and a method for optically scanning an object.

II. BACKGROUND OF THE INVENTION

In the fields of medicine, biophysics, biology, pharmacology, material control and image archiving of histological preparations, optical scanning microscopes are required which have a high throughput (that is to say they can optically acquire a large number of objects in a short period of time) and can acquire, in the form of an image, large areas, for example of the order of magnitude of up to 20cm×20cm, with a typical image resolution of approximately 1μm. The intention is further to create depth profiles of the object to be optically scanned for specific applications.

A scanning microscope of this type is usually equipped with an image-producing scanner camera whose pixels are produced in the form of an integrated circuit (chip) in CMOS technology and which scanner camera is arranged on the image plane of the microscope. An objective lens system in the microscope permits different magnifications of object images on the object plane which are typical for microscopy, for example 10-fold, 20-fold, 50-fold, 100-fold, etc.

In order to optically scan an object, a mechanical translation stage moves horizontally under computer control, the two basic directions of this horizontal movement usually being referred to as "x-direction" and as "y-direction". The movement in the "z-direction", that is to say the vertical movement and hence the focusing of the microscope, is ensured by means of a computer-controlled linear guidance of the objective lens system. Depending on the magnification and the specifications of the objective lens system, a typical field of view of a microscope of this type has a size of approximately 200μm×200μm and is completely imaged on the image plane on the photosensitive image-recording chip (e.g. CMOS chip) of the scanner camera. Nowadays a color camera having a resolution of more than from 1Mpixel is used as a scanner camera.

For an area of 10cm×10cm to be optically scanned, the scanner camera thus produces about 250,000 individual images. This number potentially still needs to be multiplied by the number of the depth profile images. The individual images of each plane, which are recorded in a step-by-step fashion and are located one next to the other, can then be combined by "software stitching" to form one or more total images. The total images can subsequently be analyzed automatically under computer control and depending on the application.

Electronic acquisition of such large amounts of data and the simultaneous image processing and image storing in real time is largely unproblematic and currently achieved at approximately 10-100 frames per second (fps) at full image size. Future developments will probably be able to increase this value again by a factor of 10. If an image processing rate of 100fps is taken as a basis, a complete microscopic image acquisition of the area in the abovementioned example of 100cm² is possible electronically in approximately 40 minutes. If the intention is for only parts of the area to be acquired microscopically (e.g. an arrangement of object slides or a sample matrix), this number is correspondingly lower.

The mechanical realization of the movement operations, however, poses a problem, since, in order to record an image, the object always has to be brought into a rest position. The mechanics of a commercial mechanical translation stage are, however, not able to carry out such a high number of starting operations (accelerations) and stopping operations (decelerations), in accordance with the above-described example 100 starting/stopping operations per second, with simultaneously low travel (ca. 200μm).

Instability of the mechanical system of the scanning microscope occurs additionally on account of inevitable considerable mechanical oscillations which are caused by the starting/stopping operations which occur at short intervals. The number of starting/stopping operations in continuous operation is therefore limited to about 1-3 per second. Necessary longer displacement distances, such as, for example, when relocating specific positions, when moving toward object slides or in the case of multiple samples, are irrelevant in terms of the time balance of a scanning operation.

III. SUMMARY OF THE INVENTION

The invention is thus based on the problem of providing a scanner arrangement, for example for use in a scanning microscope, and a method for optically scanning an object, in which arrangement and method an object having an area to be optically scanned of the order of magnitude of 100cm² can simply be optically scanned at an image processing rate of 100fps and more while avoiding the mechanical oscillations known from the prior art.

A scanner arrangement according to the invention, in particular a scanning microscope, for optically scanning an object in a sequence of scanning steps, has a drivable moving object stage and an objective assembly, which has a front objective lens on an objective lens carriage which can be moved parallel to the object stage by a carriage drive, wherein the object stage can be driven during the sequence of scanning steps in order to achieve a continuous movement and the objective lens carriage with the front objective lens can be driven in each of the scanning steps for a forward movement step, in which the front objective lens is moved synchronously with the object stage out of an initial position, and in each case between successive scanning steps for a backward movement into the initial position, with the object being able to be optically scanned during the continuous movement of the object stage.

In a method, according to the invention, for optically scanning an object in a sequence of scanning steps by means of a scanner arrangement, in particular a scanning microscope, having an objective assembly with a front objective lens, the scanning steps are carried out during the continuous movement of the object by virtue of the fact that the front objective lens of the objective assembly is moved synchronously with the object out of an initial position during each of the scanning steps and is moved back into the initial position between the respective scanning steps.

As can be seen, the front objective lens of the objective assembly is at rest, according to the invention, as the object moves, relative to the moving object during each of the scanning steps, that is to say during the recording of an image of the visible object section by means of a scanner camera coupled optically to the objective assembly, because the objective lens carriage, with the fitted front objective lens, moves with the moving object in an even and synchronous manner, that is to say in the same direction and at the same speed.

Since the front objective lens moves back into its initial position between two successive scanning steps, the front objective lens thus always starts each successive scanning step in the same place.

The drive of the object stage, the carriage drive and also the trigger and diaphragm mechanism of the scanner camera are driven by means of a suitable control means, for example by means of a control computer, which controls the interplay of the forward movement of the object by means of the object stage, the forward and backward movement of the front objective lens on the objective lens carriage by means of the carriage drive and the image recording by the scanner camera by means of the trigger and diaphragm mechanism.

An advantage of the invention can be seen in the fact that, by means of the movement of the front objective lens of the objective assembly with the object during each of the scanning steps, the high number of starting/stopping operations of the object stage (usually a mechanical translation stage) known from the prior art is avoided. This leads, according to the invention, to a considerable improvement in the stability of the entire scanner arrangement as compared to the prior art, which makes possible a considerably higher image recording frequency.

Another advantage of the invention is that the motor used to drive the object stage shows significantly less wear as compared to the prior art on account of the considerably reduced starting/stopping operations. Thus the service life of the object stage and, in this respect, consequently also of the entire scanner arrangement is increased according to the invention. In addition, a simple and hence cheap linear motor which moves, according to the invention, at constant speed suffices as the drive for the object stage.

Yet another advantage of the invention can be seen in that the time required for optically scanning the object is shorter than in the prior art, because the invention dispenses with the time-consuming starting/stopping operations. In particular, the image recording rate can be increased by a factor of 30 to 100 as compared to the prior art.

The carriage drive preferably has a forward movement device with a piezoelement. The forward movement device is used in this context to translate the front objective lens on the objective lens carriage parallel to, and at the same speed and in the same direction as, the object out of its initial position into an end position during the scanning operations. The piezoelement preferably has a maximum travel in the range between 100µm and 1mm and in particular of 500µm. The piezoelement can also preferably be operated at a frequency in the range of between 10Hz and 200Hz, in particular at a frequency of 100Hz.

The carriage drive preferably has a backward movement device with a permanent magnet. The backward movement device is used in this context to translate the front objective lens on the objective lens carriage out of its end position into its initial position between the scanning steps. In particular, two permanent magnets are used as a preferred development for the backward movement device. For this purpose, one permanent magnet is fitted on the objective lens carriage of the objective assembly and the second permanent magnet is fitted on a separate holder of the scanner arrangement, with both permanent magnets repelling each other on account of the arrangement of their magnetic poles and of the magnetic force produced thereby.

As soon as a voltage is present at the piezoelement of the forward movement device, the piezoelement translates the objective lens carriage and hence the front objective lens from its initial position in the direction opposite the magnetic force emanating from the two permanent magnets of the backward movement device. The front objective lens which is fitted on the objective lens carriage is again translated into its initial position after the piezoelement is disconnected from the voltage supply on account of the magnetic force.

In a preferred development of the invention, the front objective lens has a lens viewing area on the object and the objective assembly has an objective viewing area on the object. The lens viewing area is preferably larger than the objective viewing area. The respective viewing area on the object results here from the field of view of the respective optical component(s). In particular, the diameter of the front objective lens is larger than the diameter of the objective field of view at the location of the front objective lens. At the same time, the deviation of the front objective lens from the optical axis of the objective assembly during the forward movement step is still so small that no visible additional imaging errors occur on the image plane on the image recording chip of the scanner camera.

In another preferred development of the scanner arrangement according to the invention, the latter has an additional piezoelement which is fitted on the objective assembly such that the objective assembly can be adjusted along its optical axis such that the focus of the objective assembly can be set. On account of this, a depth profile of the object can be recorded. This setting of the focus can, for example, take place during the movement of the front objective lens with the object from the initial position into the end position of the front objective lens.

The scanner camera preferably has an image recording chip which is produced using CMOS technology.

The scanner arrangement used as scanning microscope is intended especially for use in the fields of image archiving, biology, biophysics, pharmacology, material control and medicine of histological preparations.

IV. BRIEF DESCRIPTION OF THE DRAWINGS

An exemplary embodiment of the invention is illustrated schematically in the figures and is explained in more detail below. In this case, identical reference symbols designate identical components.

In the figures

V. DETAILED DESCRIPTION OF INVENTION

Figure 1:
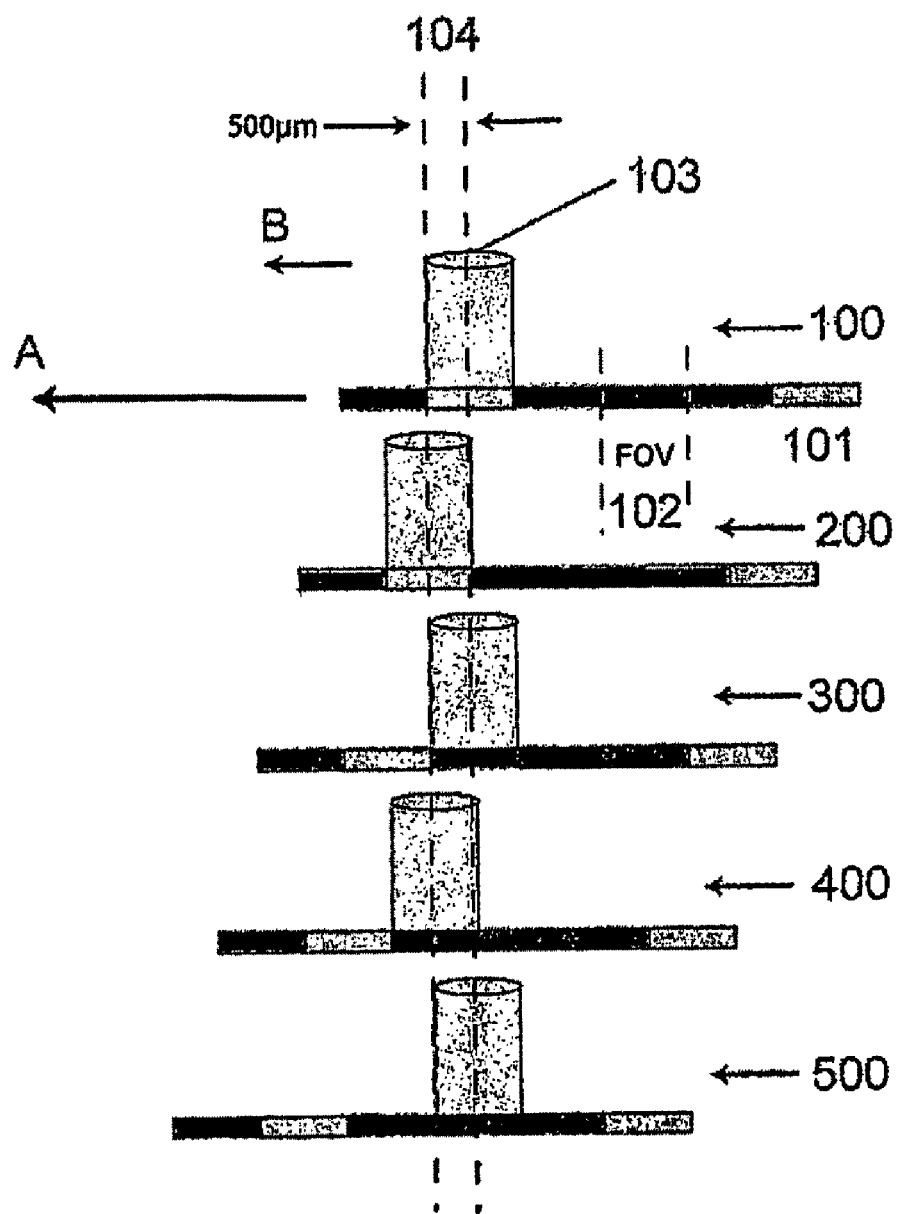
FIG. 1 shows a schematic illustration of the principle of image recording in accordance with an exemplary embodiment of the invention.

FIG. 1 shows a schematic illustration of the principle of image recording in accordance with an exemplary embodiment of the invention.

Reference symbol 100 is used to illustrate an object 101 to be scanned in a first position, which object moves continuously at constant speed in the direction of the arrow A. The object 101 has a plurality of identical lens viewing areas 102 which are to be recorded in a step-by-step fashion one after another by means of a scanner camera (not illustrated) through an objective assembly. Here, the cross sectional area of the lens viewing areas 102 on the object 101 corresponds to the cross section of the field of view of a front objective lens 103 on the object 101. The front objective lens 103 is part of the objective assembly and in this exemplary embodiment has an individual lens with a diameter of about 5mm. The scanner camera has a camera field of view whose cross section on the object 101 is designated as camera viewing area 104 whose size depends on the objective. The lens viewing area 102 (FoV) of the front objective lens 103 is illustrated, in position 100, flush on the left with the camera viewing area 104.

During the recording of an image of the object 101 by means of the scanner camera, that is to say during a scanning step, the front objective lens 103 is also moved in addition to the moving object 101. The front objective lens 103 is moved, in accordance with the exemplary embodiment, by means of a piezocrystal, which can translate the front objective lens 103 by up to 500µm, and is indicated by the arrow B. In this case, the front objective lens 103 is moved by the same distance, at the same speed and in the same direction as the object 101, that is to say the movement of the front objective lens 103 is matched to the movement of the object 101. This matching of the movement of the front objective lens 103 to the movement of the object 101 takes place by means of a suitable control means, for example a control computer. As can be seen, the front objective lens 103 is "at rest" with respect to the object 101 during the scanning step, that is to say the scanner camera records a "standing image".

At the end of the respective scanning step, the front objective lens 103 is in the end position (designated by reference symbol 200) in which the lens viewing area 102 of the front objective lens 103 is illustrated flush on the right with the camera viewing area 104. Before the subsequent scanning step starts, only the front objective lens 103 is now moved back again into its initial position, whereas the object 101 continues to move in the direction of the arrow A. The front objective lens 103 is moved back, in accordance with the exemplary embodiment, by means of suitable fitted permanent magnets (details in this respect are described in the following figures). The front objective lens 103 which is moved back is illustrated in position 300. Position 300 is the same as position 100 except for the object 101 which is translated in the direction of arrow A by one lens viewing area 102 (FoV).

During the next scanning step, both the object 101 and the front objective lens 103 are now translated again in the direction of arrow A or B, respectively. At the end of the next scanning step, the object 101 and the front objective lens 103 are in position 400, which is the same as position 200 except for the object 101 which is translated in the direction of arrow A by one lens viewing area 102. The front objective lens 103 is then moved back again into its initial position, after which the system is in the position designated by the reference symbol 500. Position 500 is the same as position 100 except for the object 101 which is translated in the direction of arrow A by two lens viewing areas 102.

A scanner arrangement 50 in accordance with the exemplary embodiment of the invention provided as scanning microscope is now described in detail.

Figure 2:
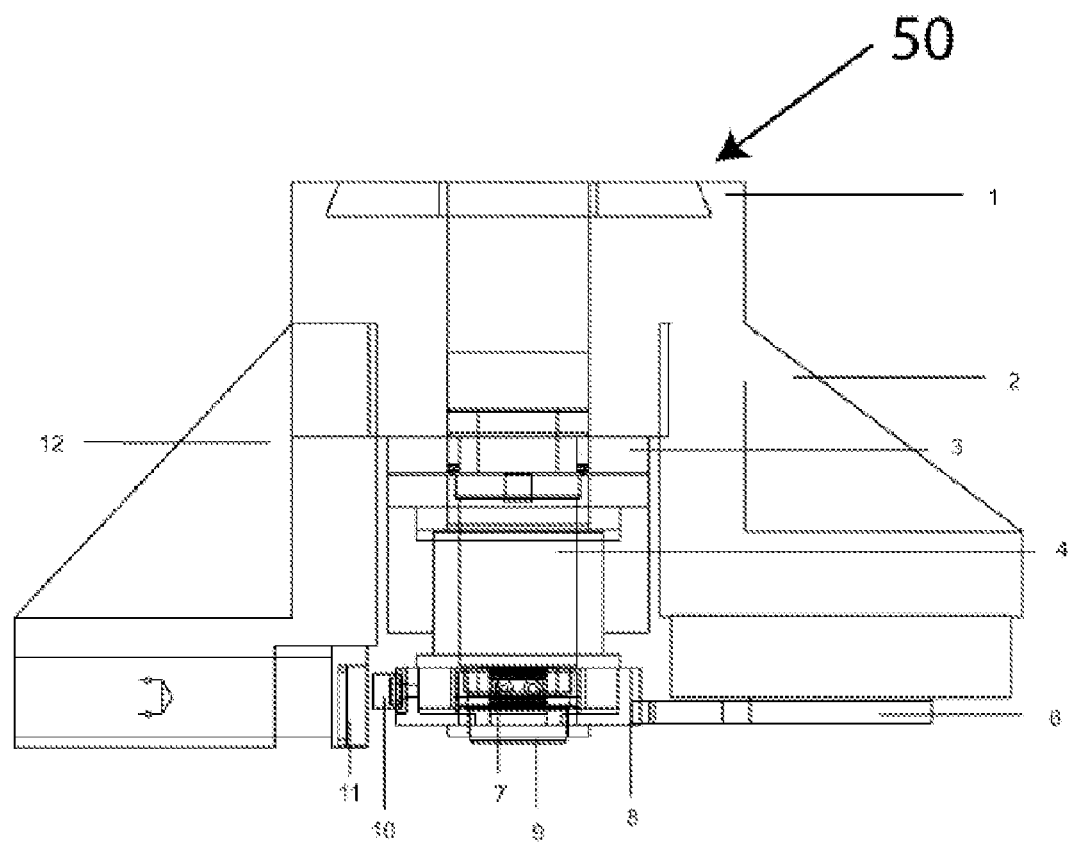
FIG. 2 shows a cross sectional view of a scanner arrangement in accordance with the exemplary embodiment of the invention.

FIG. 2 represents a cross sectional view of the scanner arrangement 50.

The scanner arrangement 50 has a holder 1 at whose upper end a conventional scanner camera (not illustrated and not described in further detail) is fitted. The scanner camera is fixed in place and therefore remains at a standstill when an object is optically scanned, that is to say the object moves past the scanner camera. A piezoactuated objective holder 3 is fitted on the center of the holder 1 below the scanner camera, to whose bottom side an objective assembly 4, 7-10 (in FIG. 3) is attached. The piezoactuated objective holder 3 is used to set the exact focal point of the objective assembly 4, 7-10 (in FIG. 3), that is to say to adjust the position of the objective assembly 4, 7-10 (in FIG. 3) along the optical axis of the objective assembly 4, 7-10 (in FIG. 3) relative to the scanner camera. In accordance with this exemplary embodiment, the piezoactuated objective holder 3 used is the model Pifoc P-725.4CD.

Figure 3:
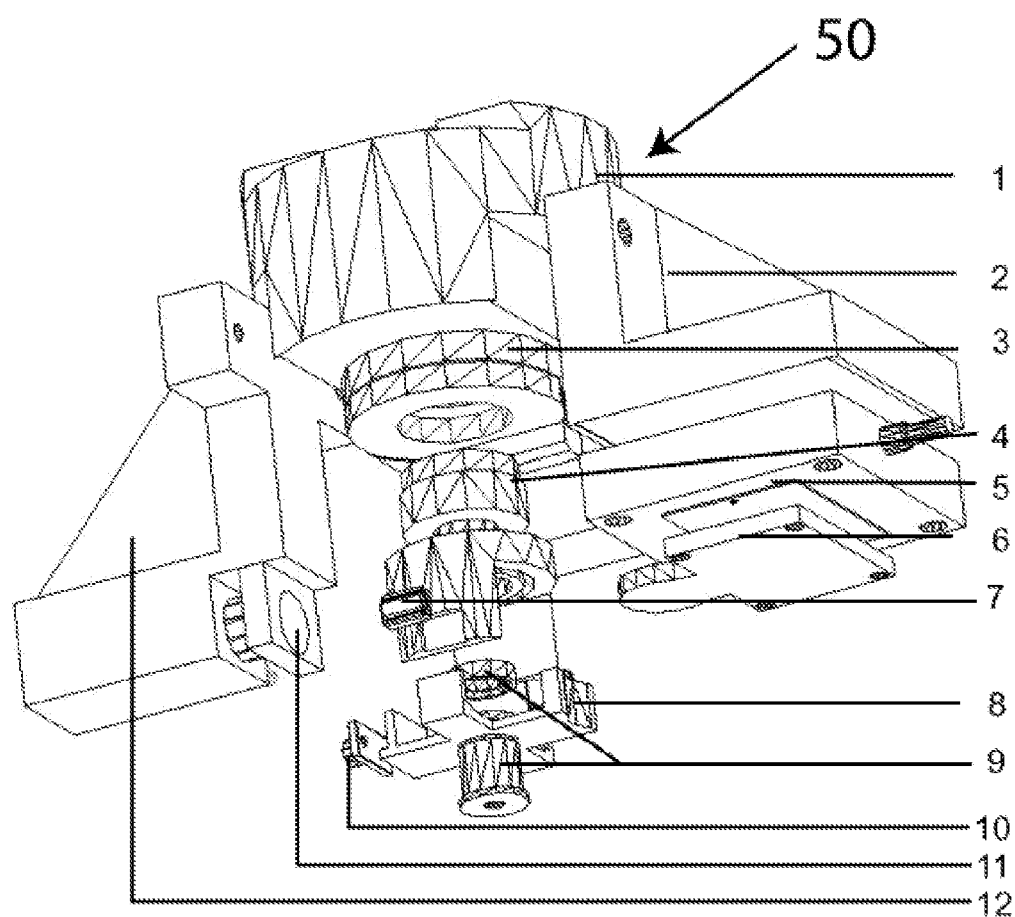
FIG. 3 shows a perspective exploded view of the scanner arrangement in accordance with the exemplary embodiment of the invention.

The objective assembly 4, 7-10 (cf. FIG. 3) has an objective upper part 4, attached to the piezoactuated objective holder 3 and fixed in place just like the scanner camera, and a translatable objective lower part 7-10 (in FIG. 3). The objective upper part 4 has, in accordance with the exemplary embodiment, a scattered light protective diaphragm which can be screwed in, two minirail milled indentations for attachment purposes and a locking ring. In addition, the objective upper part 4 is optically coupled to the scanner camera. The objective lower part 7-10 has minirail guides 7 (cf. FIG. 3) which are in engagement with the two minirail milled indentations for attachment purposes, twice the model MDN-05-10-05in accordance with the exemplary embodiment, has an objective lens carriage 8, which is also referred to as lens guiding plate and has a screw-in thread for a front lens holder, a permanent magnet holder and a Teflon-coated sliding contact bearing for a pressure plate 6, has a front lens holder 9, which can be screwed in, with front lens cover screw and has a permanent magnet 10 which is integrated in the permanent magnet holder on the objective lens carriage 8.

In each case one attachment bracket 2, 12 is fitted on the holder 1 to the left and right of the objective assembly 4, 7-10 (cf. FIG. 3). A translation stage 5 driven by means of a piezoelement, a Hera Piezo stage model P-625.1CD in accordance with the exemplary embodiment, and, beneath it, a pressure plate 6 are fitted to the bottom side of the right-hand attachment bracket 2. The pressure plate 6 is translated, by means of the translation stage 5, in the direction of the left-hand attachment bracket 12 parallel to the movement direction of the object which is to be optically scanned and was translated by means of an object stage. Since the pressure plate 6 abuts the objective lens carriage 8, the objective lens carriage 8 is simultaneously moved in the same direction when the pressure plate 6 is moved. This movement is correspondingly supported by the minirail guides 7 (cf. FIG. 3).

On the bottom side of the left-hand attachment bracket 12, an adjustable guide is fitted, to which, in turn, a permanent magnet 11 is attached. The adjustable guide is used for the accurate positioning of the permanent magnet 11, which can also be referred to as permanent magnetic stamp, with respect to the permanent magnet 10 on the objective lens carriage 8. It is important here to ensure the correct arrangement of the poles of the two permanent magnets 10 and 11: since the pressure plate 6 translates the objective lens carriage 8 in the direction toward the left-hand attachment bracket 12 on account of the translation stage 5 which is driven by means of the piezoelement (more accurately: piezoelectric element) if a voltage is present in the associated piezocrystal, the two permanent magnets 10, 11 must be mounted such that they magnetically repel each other in order to move back the objective lens carriage 8 into the initial position when the piezocrystal is without voltage.

The scanner arrangement 50, which the inventors named the AMBIS system (Anti Motion-Blurring Imaging Scanning System), permits the complete circumvention of the mechanical starting/stopping operations in a microscope system known from the prior art. This is ensured by the use of a piezoelectric element with long travel. A piezoelectric element of this type now only moves the objective lower part 7-10 weighing only a few grams with the front objective lens and the objective lens carriage 8. The object stage can be moved away in the y-direction, that is in the direction of the left-hand attachment bracket 12 viewed from the right-hand attachment bracket 2, at constant speed underneath the front objective lens. The piezoelement compensates for the movement of the object stage in a manner such that it moves the objective lower part 7-10 synchronously with the front objective lens and the objective lens carriage 8 in the same direction and at the same speed as the object such that, for the time of the recording of a partial image of the object, that is to say during a scanning step, a "standing image" is produced for the scanner camera.

If an image recording rate of 100 fps and also a field of view of 200μm×200μm on the object are used as a basis in this exemplary embodiment, all scanning steps can be joined seamlessly when the object stage moves at a speed of 2cm/s.

The piezoelement used for the horizontal translation of the objective lower part 7-10 in this exemplary embodiment is specified at a maximum travel of 500μm and can be traversed up to a frequency of 100Hz. Once the desired travel, which, depending on the respective application, corresponds to the width of a lens viewing area on the object, is reached, the objective lower part 7-10 with the front objective lens and the objective lens carriage 8 is moved back into the original position by switching off the piezo-voltage and assisted by the magnetic fields, having the same polarity, of the two permanent magnets 10, 11. This guiding-back process takes less than 5ms.

The movement of the piezocrystal of the translation stage 5 is coupled to the movement of the y-axis of the object stage via an electronic feedback system. Over a displacement area of 500μm (or over a period of 25ms using the above speed value of 2cm/s), the impression of a "standing image" is thus created. This time is significantly longer than the electronic diaphragm opening time of the scanner camera. During the movement operation, the deviation of the front objective lens from the optical axis of the scanner arrangement 50 of the scanning microscope is still so small that no visible additional imaging errors occur on the image plane on the scanner camera.

The abovementioned electronic feedback system controls not only the movement of the piezocrystal of the translation stage 5, but also the diaphragm opening of the scanner camera as a function of the movement of the y-axis of the object stage. A commercially available control computer can be used as electronic feedback system.

The movement of the entire objective lower part 7-10 in the z-direction (that is to say along the optical axis of the objective assembly 4, 7-10 or perpendicular to the translational plane of the object) can be actuated in the same way by means of at least one piezoelement. This likewise makes possible a simultaneous recording of a depth profile of the object to be optically scanned (or also a possible further focusing of the scanner arrangement 50) during the phase of the "standing image", i.e. during a scanning step.

FIG. 3 now shows a perspective exploded view of the scanner arrangement 50 in accordance with the exemplary embodiment of the invention. Parts already described in FIG. 2 are not described again.

In this illustration of the scanner arrangement 50, the minirail guides 7, which are in engagement with the minirail milled indentations for attachment purposes, are now also clearly visible. Said minirail guides 7 ensure that the objective lens carriage 8 is held at a prescribed constant distance with respect to the object stage during its movement parallel to the object stage over the object to be scanned.

Figure 4:
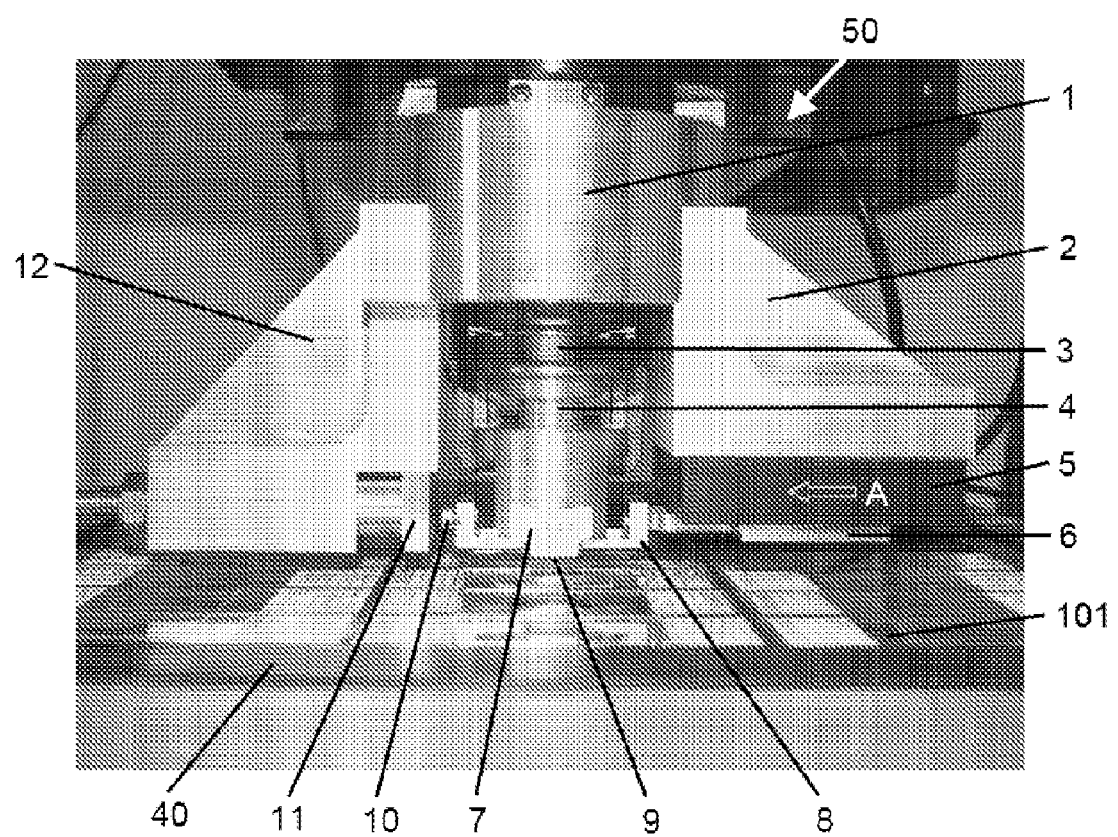
FIG. 4 shows a side view of the scanner arrangement in accordance with the exemplary embodiment of the invention.

FIG. 4 shows a side view of the scanner arrangement 50 in accordance with the exemplary embodiment of the invention. Parts already described in FIG. 2 are not described again.

Besides the scanner arrangement 50, FIG. 4 also illustrates an object 101 to be scanned which is positioned on an object stage 40 for translation purposes. While the object 101 is translated continuously in the direction of arrow A by means of the object stage 40 and also during each of the scanning steps, the translation stage 5 which is driven by means of the piezoelement also translates the front objective lens in the direction of the arrow A, wherein the force of the translation stage 5 is transferred, by means of the pressure plate 6, to the objective lens carriage 8, on which finally the front objective lens to be moved is attached.

Figure 5:
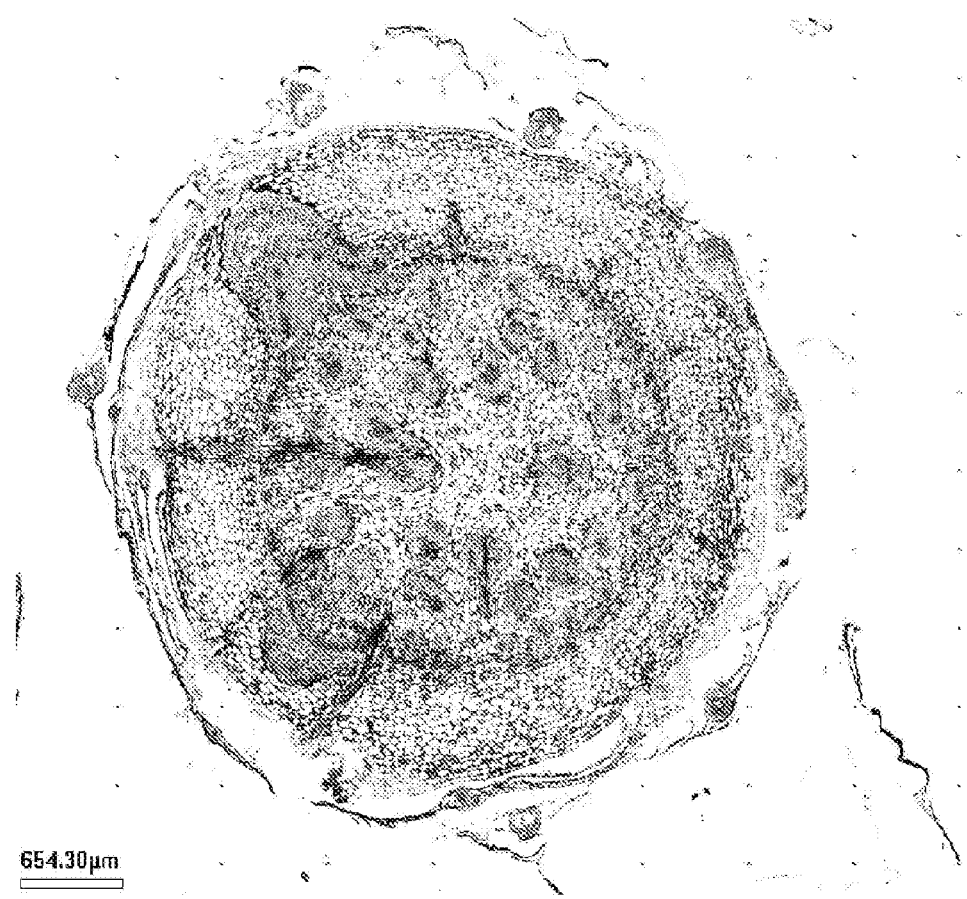
FIG. 5 shows a graphic representation of an object, which was composed of a plurality of images recorded by means of the scanner arrangement in accordance with the exemplary embodiment of the invention.

FIG. 5 finally displays a graphic representation 60 of an object, which was composed of a plurality of partial images recorded by means of the scanner arrangement 50 in accordance with the exemplary embodiment of the invention.

The cross section of a lily of the valley rhizome was used as the object in this exemplary embodiment. The scale of the graphic representation 60 (see bottom left in FIG. 5) is 654.30μm. A resolution of between 1μm and 2μm could be achieved for the graphic representation 60 using the scanner arrangement 50.

Since the scanner camera used in the scanner arrangement 50 is connected to a computer for image reading, image processing and image storing purposes, it is possible to show specific areas of the graphic representation 60 shown in FIG. 5 of the optically scanned object in a manner such that they are also enlarged as desired using software.

The invention claimed is:

1. A scanner arrangement, in particular a scanning microscope, for optically scanning an object in a sequence of scanning steps, comprising:
    a driveable moving object stage arranged for positioning the object thereon and moving the object,
    a carriage drive, and
    an objective assembly having
        an objective lens carriage, and
        a front objective lens on the objective lens carriage which is arranged to be moved parallel to a movement direction of the object stage by the carriage drive;
    wherein the object stage is configured to be driven during the sequence of scanning steps in order to achieve a continuous movement, and
    the objective lens carriage with the front objective lens is configured to be driven in each of the scanning steps for a forward movement step, in which the front objective lens is moved synchronously with the object stage in the same direction as the object stage out of an initial position, and in each case between successive scanning steps for a backward movement into the initial position, with the object being optically scanned during the continuous movement of the object stage.

2. The scanner arrangement as claimed in claim 1, wherein the carriage drive has a forward movement device with a piezoelement.

3. The scanner arrangement as claimed in claim 2, wherein the piezoelement has a maximum travel in the range between 100 μm and 1 mm.

4. The scanner arrangement as claimed in claim 2, wherein the piezoelement is operated at a frequency in the range of between 5 Hz and 200 Hz.

5. The scanner arrangement as claimed in claim 2, in which the piezoelement has a maximum travel of about 500 µm.

6. The scanner arrangement as claimed in claim 2, in which the piezoelement is operated at a frequency in the range of between 25 Hz and 120 Hz.

7. The scanner arrangement as claimed in claim 1, wherein the carriage drive has a backward movement device with a permanent magnet.

8. The scanner arrangement as claimed in claim 1, wherein the front objective lens has a lens viewing area on the object, and
the objective assembly has an objective viewing area on the object, the lens viewing area being larger than the objective viewing area.

9. Scanner arrangement as claimed in claim 1, further comprising an additional piezoelement which is fitted on the objective assembly, and the additional piezoelement is configured to adjust the objective assembly along its optical axis for setting the focus of the objective assembly for recording a depth profile of the object.

10. A method for optically scanning an object in a sequence of scanning steps by means of a scanner arrangement, in particular a scanning microscope, having an objective assembly with a front objective lens, in which the scanning steps are carried out during a continuous movement of the object by virtue of the fact that the front objective lens of the objective assembly is moved synchronously with the object in the same direction as the object out of an initial position during each of the scanning steps and is moved back into the initial position between the respective scanning steps.

11. The method as claimed in claim 10, in which the front objective lens is concomitantly moved during the scanning steps by means of a piezoelement.

12. The method as claimed in claim 10, in which the front objective lens is moved backward between the scanning steps by means of a permanent magnet.

13. The method as claimed in claim 10, in which the objective assembly with objective viewing area and the front objective lens with lens viewing area used are of a type such that the objective viewing area on the object is larger than the lens viewing area on the object.

14. The method as claimed in claim 10, in which an additional piezoelement which is fitted on the objective assembly is used for adjusting the objective assembly along its optical axis for setting the focus of the objective assembly for recording a depth profile of the object during the movement of the front objective lens with the object.

15. A system comprising:
an object stage,
a support structure,
an objective assembly having
an upper part connected to said support structure,
an objective lens carriage in sliding engagement with said upper part,
an objective lens mounted on said objective lens carriage,
an objective magnet mounted on said objective lens carriage,
a translation stage mounted on said support structure,
a pressure plate mounted on said translation stage, said pressure plate abutting said objective lens carriage, and
a second magnet mounted on said support structure, said second magnet having an opposite polarity with said objective magnet when said translation stage is moving and the same polarity with said objective magnet to return said objective lens carriage to an initial position; and
wherein said objective lens is arranged to move in parallel with the object stage and the objective lens is arranged to move synchronously with the object stage out of an initial position.

16. The system as claimed in claim 15, further comprising control means for moving said translation stage from an initial position to a second position and controlling the polarity of the second magnet while said object stage is moved.

17. The system as claimed in claim 15, further comprising a piezoelectric element in communication with said translation stage.

18. The system as claimed in claim 17, wherein the piezoelectric element provides a maximum travel in the range between 100 µm and 1 mm.

19. The system as claimed in claim 15, wherein said objective assembly includes a piezoelement connected to said upper part, and
wherein said piezoelement is configured to move parallel to an optical axis.

20. A method for optically scanning an object with a scanner having an objective lens comprising:
continually moving the object below the scanner,
moving the objective lens synchronously with the object in the same direction as the object from an initial position to a second position,
scanning the object during movement from the initial position to the second position, and
moving the objective lens from the second position to the initial position between respective scanning steps.

* * * * *